June 19, 1945. H. G. JENSEN ET AL 2,378,557

REMOTE CONTROL FOR PHONOGRAPHS

Filed July 24, 1941 7 Sheets-Sheet 1

Inventors:
Herman G. Jensen
and Marvin G. Nielsen,
By McCaleb, Hendl and Dickinson
Attorneys.

Fig. 2

Patented June 19, 1945

2,378,557

UNITED STATES PATENT OFFICE 2,378,557

REMOTE CONTROL FOR PHONOGRAPHS

Herman G. Jensen, Chicago, and Marvin G. Nelsen, Skokie, Ill., assignors to J. P. Seeburg Corporation, Chicago, Ill., a corporation of Illinois Application July 24, 1941, Serial No. 403,816

25 Claims. (Cl. 194—15)

This invention relates to remote control for phonographs and particularly to a remote control in which means are provided for selecting a desired recording or recordings to be played by the phonograph and in which means are also provided for releasing the mechanism by means of inserted coins to permit actuation of the phonograph only to the extent paid for by the patron.

This remote control is described in detail hereinafter in connection with a mechanism of the same general type as that described and claimed in the copending applications Serial No. 259,586, filed March 3, 1939, by James A. Boyajian, and Serial No. 341,433, filed June 20, 1940, by James A. Boyajian.

In the remote controls described and claimed in the aforesaid applications, impulse creating means are provided for sending out a series of electrical impulses in number corresponding individually to an individual selection to be played at the desire of the patron.

The remote control devices of the aforesaid applications were single-coin devices, being adapted to receive a nickel which is the conventional payment in this art for the rendition of one recording. In the former of these two applications, a magazine switch was provided whereby a plurality of credits could be stored up by the insertion of a successive number of coins of the same denomination, for example one nickel, which credit was expended step by step on each selection by the patron.

One of the objects of the present invention is to provide in a remote control of this type, improved, compact and simplified mechanism whereby the device is adapted to be actuated by any of a plurality of coins of different denominations in order to condition the device for the selection of an appropriate number of recordings.

Another object of the present invention is to provide an improved device in which only one switch is actuated by each coin and in which automatic mechanism is employed both for sending out selecting impulses and for storing up credit corresponding to coins of larger denomination.

Other objects, advantages and capabilities of the invention will appear from the following description of a preferred embodiment thereof taken in conjunction with the accompanying drawings, in which.

Our improved remote control mechanism as illustrated in the accompanying drawings is adapted for mounting upon a bar. It comprises a housing having a major vertical portion 20 which is adapted to be located in vertical position at the inner or rear edge of the bar. This housing portion 20 carries on its forward side a pair of adjustable brackets 21 whereby the box as a whole may be readily secured to the bar.

From the upper end of the housing portion 20 extends downwardly and forwardly in oblique relation a second major housing portion 22. The housing portion 22 is provided with a removable front or upper panel 23 which is provided with a window 24 and with a series of openings 25 through which project buttons 26 corresponding to individual recordings to be selected and played.

The front or upper panel 23 is normally held in position by means of a latch assembly 27 which is provided with latching members 28 and 29 which are adapted to cooperate with latching elements 30 and 31, respectively, on the panel 23. The latching assembly comprises a handle portion which extends rearwardly into a position near the removable rear panel 32 of the major housing portion 20. It will be readily understood that if the removable panel 32 is removed and the handle portion 33 is moved rearwardly the front panel 23 can be lifted off.

The latching assembly is slidably mounted upon a chassis 34 which occupies the second principal housing portion 22. This chassis comprises two longitudinal switch assemblies 35 and 36 and two transverse members 37 and 38. The switch assemblies 35 and 36 comprise slidably mounted members 39 in number corresponding to the number of recordings to be controlled and each slidable member 39 carries one of the buttons 26. When any one of the buttons 26 is moved inwardly, certain switching operations are effected which will hereinafter be fully described.

Each switch assembly 35 and 36 is provided with a locking bar 40 which is adapted to lock any and all of the switching members in normal or actuated position. The latching bars 40 are normally in non-latching position, being held there against the tension of springs 41 by means of arms 42 pivotally mounted on the chassis 34. The inner ends of the arms 42 are pivotally connected to a bar assembly 42', the upper end of which is forked, the fork arms being located on either side of a shaft 44. The bar assembly 42' is biased upwardly by a spring 44' connected to the bar assembly and to the chassis. The shaft 44 is driven by the motor 45, the motor being supported on the chassis 34. The bar assembly 42' carries an abutment 43' which is adapted to cooperate with a cam 43 rigidly carried by the shaft 44.

It will readily be understood that when the motor 45 starts to operate, the shaft 44 is rotated and the bars 40 are immediately moved to locking position. They remain in this position until the shaft 44 has made one revolution whereupon the buttons 26 are again unlocked for operation.

The slidably mounted members 39 are forced outwardly by means of springs 46' so that immediately the locking bars 40 move to unlocking position, the actuated button 26 moves outwardly again.

The motor 45 is connected to the shaft 44 through a gear reduction 46 so that the shaft 44 is driven at a relatively slow speed. The shaft 44 carries a bevel gear 47 which meshes with a bevel gear 48 of a shaft 49 which is rotatably mounted on the chassis 34. The chassis 34 rigidly carries a disc 50, the shaft 49 extending through the center of the disc.

The shaft 49 carries two arms 51 and 52 which are electrically connected together and are insulated from all other elements on the shaft 49. The shorter arm 51 makes contact with a ring 53 mounted on the disc 50. The longer arm 52 is adapted to make contact with the contacts 54 located in equally spaced relation upon the disc 50. It will readily be understood that when the shaft 49 is given one complete revolution, the arm 52 comes into engagement with each of the twenty-five contacts 54.

The shaft 49 also carries two arms 55 and 56. The arm 55 is adapted to engage a segmental contact 57 and the arm 56 is adapted to engage six contacts 58 arranged in an arc on the disc 50. It will readily be understood that when the shaft 49 makes one complete revolution, the arm 55 moves over the contact 57 and while it is moving over this contact, the arm 56 moves over the six contacts 58. The arms 55 and 56 are conductively connected together and are insulated from all other elements on the shaft 49.

The shaft 44 carries a cam 59 which is adapted, during each rotation of the shaft, to open a switch 60 momentarily. The cam 59 is arranged to open the switch 60 after the shaft 44 has rotated through one-third of a revolution. The shaft 44 also carries a detent 61 which is adapted to move back a ratchet wheel 62 through one tooth during each rotation of the shaft 44. The ratchet wheel 62 is biased in the opposite direction by a spring 63. It is normally held against rotation in said opposite direction by means of an escapement member 64 which is pivoted at 65. This escapement member is adapted to be actuated by means of an electromagnet 66 which is arranged so as to cooperate with an armature 67 integral with the escapement member 64.

Consequently, it will be understood that each time that the electromagnet 66 is energized, the ratchet wheel 62 makes one step in the counterclockwise direction, as viewed from the front of the device, and that each time the shaft 44 makes one revolution, the ratchet wheel makes one step in the clockwise direction, as viewed from the front of the device.

The ratchet wheel 62 carries a pin 68 which is adapted to control a switch 69. When the ratchet wheel 62 is in normal position, the pin 68 is in engagement with the member associated with the switch 69, holding this switch open. When, however, the electromagnet 66 is energized one or more times, the pin 68 is drawn from the switch 69 and this switch remains closed until the ratchet wheel 62 is returned to normal position by a successive number of rotations of the shaft 44.

Upon the lower end of the bar assembly 42' is rearwardly extending pin 70. In normal condition of the device, the pin 70 is in engagement with pieces of insulation 71 and 72 on the poles of two switches 73 and 74 holding these switches open. When, however, the motor 45 starts to operate, the bar assembly 42' moves upwardly and these two switches close and remain closed until the shafts 44 and 49 have made one complete revolution. At that time the cam 43 moves the bar assembly 42' downwardly and opens the switches 73 and 74.

In the lower part of the chassis 34 are mounted two relays 75 and 76 which are respectively the ten-cent relay and the twenty-five-cent relay. When the relay 75 is energized, its armature closes three normally open switches 77, 78 and 79.

When the relay 76 is energized, it closes four switches 80, 81, 82, and 83.

The armatures of the relays 75 and 76 are both adapted to cooperate with a pin 84 which projects on either side of a detent 85 which is pivotally mounted on a bracket 86 carried on the chassis. The detent 85 is biased forwardly towards the armatures of the relays 75 and 76 by a spring 87. The detent 85 normally bears against the hub of a small arm 88 which is also pivotally mounted on the bracket 86.

On its forward side, the arm 88 has a laterally turned portion against which normally projects a piece of insulation 89 carried on one of the leaves of a normally closed switch 90. The resilience of the arms of the switch 90 tends to move the arm 88 rearwardly. The arm 88 is provided with a projecting pin 91 which is adapted to cooperate with a cam member 92 carried on the bar assembly 42'. When the shaft 44 starts to rotate, the bar assembly 42' moves upwardly, withdrawing the cam member 92 away from the pin 91.

Rearward movement of the arm 88 may also be opposed by engagement of a shoulder 93 on the arm 88 against the detent member 85. If, however, the detent member 85 is withdrawn by the armature of either of the relays 75 or 76, then the arm 88 is free to move rearwardly to a sufficient degree to permit the switch 90 to open. After the switch 90 has thus been opened, it will remain open for a complete revolution of the shafts 44 and 49 notwithstanding the earlier deenergization of the relay 75 or 76, as the case may be.

At the end of a complete revolution of the shafts 44 and 59, the cam member 92 will again engage the pin 91 of the arm 88 and move it forwardly, closing the switch 90 and permitting the detent 85 to move in behind the shoulder 93 on the arm 88. It will be understood that if neither of the relays 75 nor 76 is energized and the bar assembly 42' moves upwardly, the switch 90 does not open because the shoulder 93 engages the detent 85 and holds the switch in its closed condition.

Two insulated contacts 94 are arranged to be in contact with the locking bars 40 so that these contacts are grounded when the motor is not operating. When, however, the motor is operating, the bars 40 move downwardly out of contact with the contacts 94 so as to condition the oscillator for operation, as will hereinafter be described.

Considering the contacts 54 as a series in the clockwise direction, it is to be noted that the first six of these contacts are connected together and to a conductor 95. The sixth contact which is designated "1" because it corresponds to No. 1 selection, is connected to one side of a switch 96 which is referred to as the No. 1 switch 96. The seventh contact of the series 54 is designated the No. 2 contact and this is connected to one side of a switch 96 which is designated the No. 2 switch 96, and it is also connected to the other side of the No. 1, 96 switch. The successive contacts 54 up to the second last, which is numbered 19, are likewise connected to a switch 96 which bears the same number switch 96 No. 19, for example, and also to the earlier switch 96, for example switch 96, No. 18. The last contact 54 which is contact 54 No. 20, is merely connected to one side of switch 96 No. 19.

Consequently, the switches 96 from No. 1 to No. 19, are connected in series and it will readily be seen that if any of these switches 96, for example switch 96 No. 7, is opened, the first five contacts and a corresponding additional number of contacts 54 are connected in series and to the conductor 95. Thus, with switch 96 No. 7 open, the first twelve contacts 54 are connected to conductor 95. The last thirteen are disconnected from conductor 95.

The switches 96 are constituted physically by contact elements carried by the slidably mounted members 39 and it will thus be seen that when button 26, No. 7, is pushed in, for example, switch 96 is opened and twelve, that is, the number of the button plus five, contacts 54 are connected to conductor 95. The movable switch members 39 also have switch elements corresponding to the switches 97.

The switches 97 are arranged in parallel, all of them being connected to the conductors 98 and 99. Thus, in addition to connecting a certain corresponding number of contacts 54 to the conductor 95, the pushing in of a button 26 has the effect of connecting the conductors 98 and 99.

The ring 53 is connected by a conductor 100 to one side of the switch 90, the other side of which is connected to a conductor 101.

The first three of the contacts 58 are connected to one side of the switch 79 and one side of the switch 82. The last three contacts 58 are connected to one side of the switch 83. The other sides of the switches 79, 82 and 83 are connected to a conductor 102. The segmental contact 57 is connected to a conductor 103 which is also connected to one side of the switch 73, to one side of the switch 60, to one side of the switch 78, and to one side of the switch 81.

The contacts 94 are connected to a conductor 104. The other side of switch 60 is connected to one side of switch 77 and to one side of switch 80. The other side of switch 77 is connected to one side of the relay 75 and to a conductor 105. The other side of switch 80 is connected to one side of the relay 76 and to one side of a conductor 106. The other side of the switch 73 is connected to one side of the motor 45, to one side of the motor switch 69, to the other side of the switch 78, and to the other side of the switch 81. The other side of the motor switch 69 is connected to the conductor 99.

One side of switch 74 is connected to a conductor 107, the other side being connected to a conductor 108. A conductor 109 is connected to one side of the electromagnet 66, to the other side of the motor 45, to the other side of the relay 75, and to the other side of the relay 76. The other side of the electromagnet 66 is connected to the conductor 102. A conductor 110 is connected to the chassis 34 to serve as a ground. Upon the forward side of the chassis 34 are mounted a plurality of lamps 111, one side of each of which is grounded, the other side being connected to a conductor 112.

The lamps 111 serve to illuminate a louvered program indicator 113 adapted to be mounted on the front of the chassis 34 so as to provide support for tags or labels indicating the names of the selections. The names of these selections appear opposite the buttons 26 which thus, by mere propinquity, indicate the title of the recording corresponding to the nearest button. The title cards or labels may also bear numbers corresponding to the numbers on the buttons. The titles can of course be seen through the window 24 in the front panel 23.

Figures 1, 7, 8, 9:
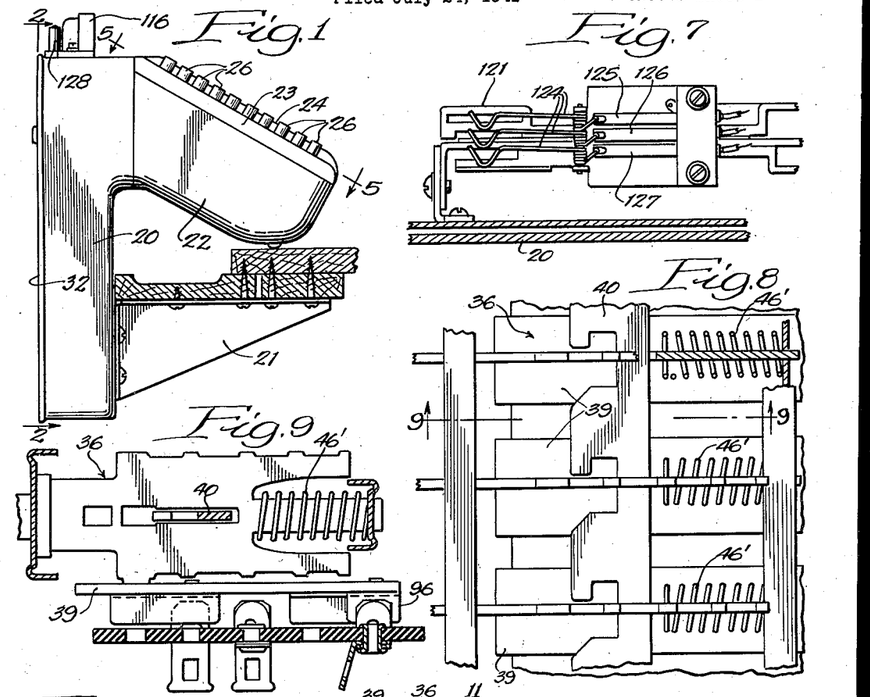
Fig. 1 is a side elevation of a remote control device embodying my invention and illustrating the manner in which the same may be mounted on a bar or table.
Fig. 7 is a fragmentary inverted view, taken on the line 7—7 of Fig. 2 and illustrating the individual coin chutes and individual switches actuated thereby.
Fig. 8 is a fragmentary view of a switch assembly partly in section, being the right hand switch assembly shown in Fig. 6.
Fig. 9 is a sectional view thereof, taken on the line 9—9 of Fig. 8.
Figure 2:
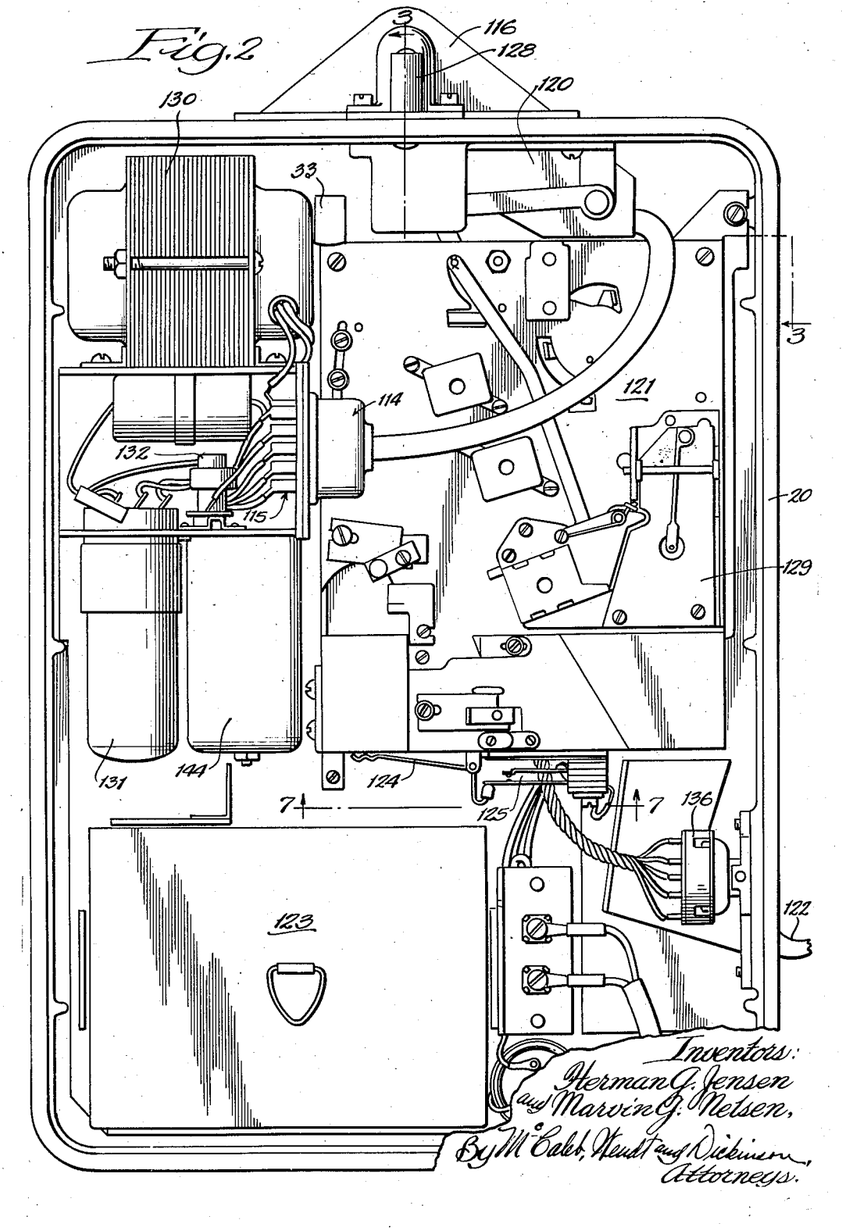
Fig. 2 is a rear elevational view of the device, with the back door removed, this view being taken on the line 2—2 of Fig. 1.
Figures 3, 4:
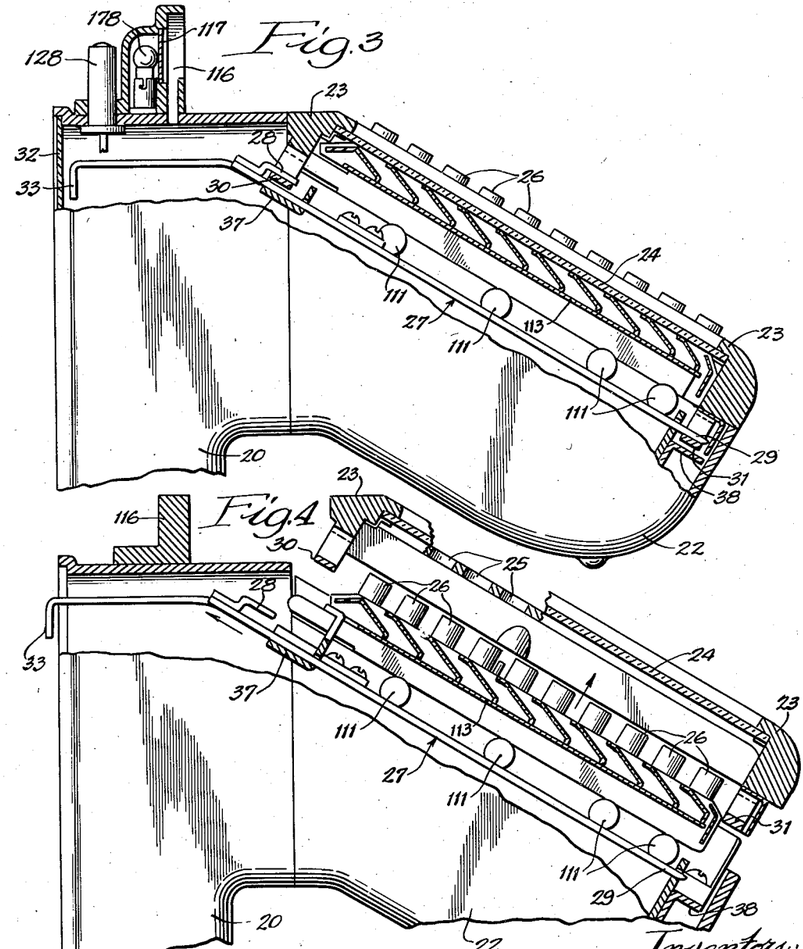
Fig. 3 is a fragmentary side elevational view of the upper portion of the device, shown partly in section, taken on the line 3—3 of Fig. 2.
Fig. 4 is a similar view illustrating the manner in which the front panel may be removed.
Figure 5:
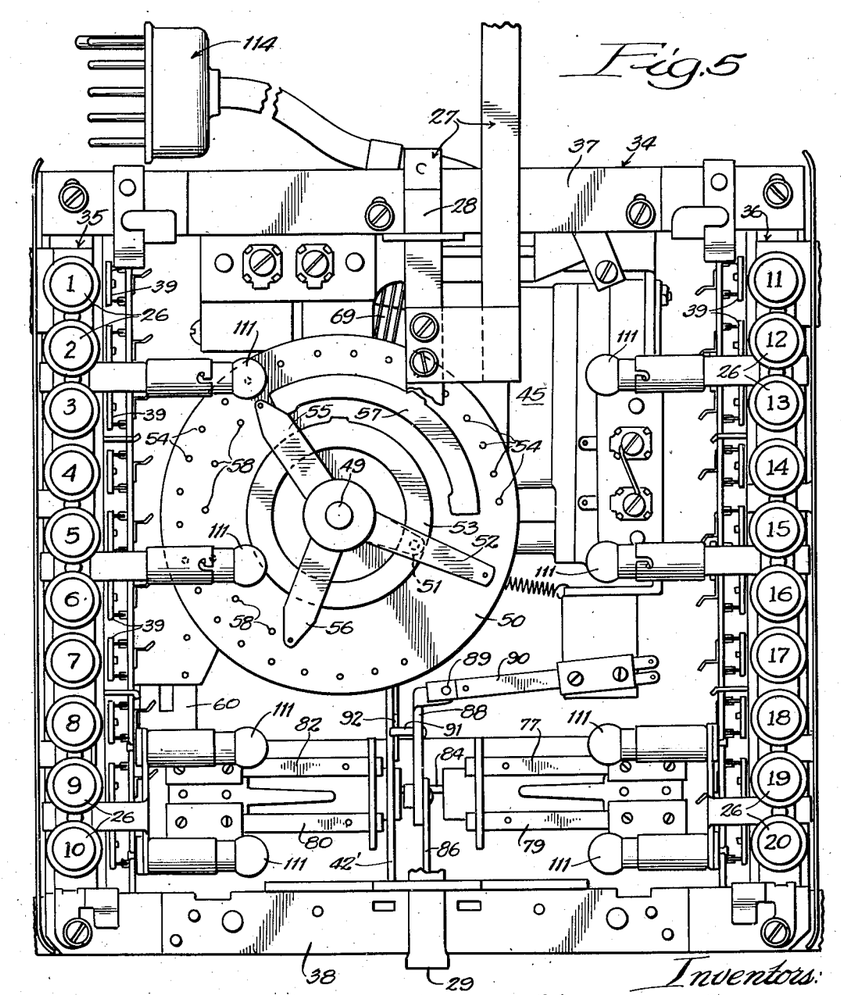
Fig. 5 is a front view of the chassis removed from the fore part of the device, this view corresponding to the chassis viewed in the device on the line 5—5 of Fig. 1.
Figures 6, 18:
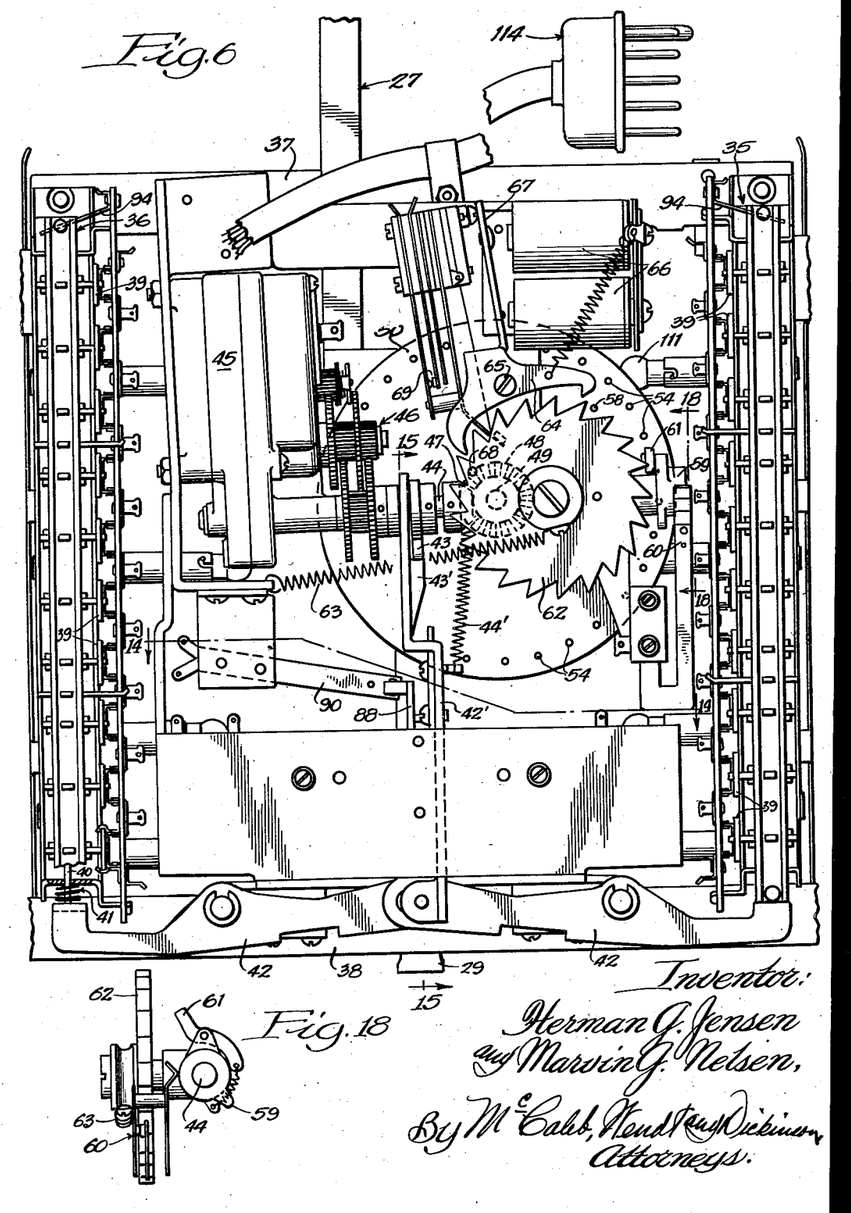
Fig. 6 is a plan view of the mechanism in the rear of that shown in Fig. 5.
Fig. 18 is a fragmentary elevational view, taken on the line 18—18 of Fig. 6, showing the manner in which the switch 60 is momentarily opened and the manner in which the ratchet wheel 62 is returned through the distance of one tooth.
Figure 10:
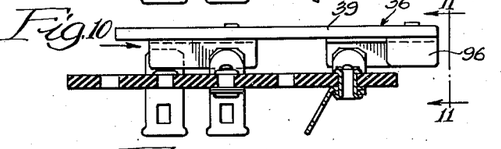
Fig. 10 is a fragmentary view of a portion of Fig. 9, showing the switch in actuated position and illustrating the manner in which the normally open switch 97 is closed and the normally closed switch 96 is opened.
Figures 11, 12:
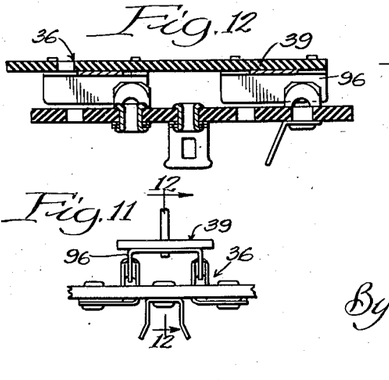
Fig. 11 is a fragmentary elevation view of the switch assembly as viewed on the line 11—11 of Fig. 10.
Fig. 12 is a fragmentary sectional detail of the switch assembly, taken on the line 12—12 of Fig. 11.
Figure 13:
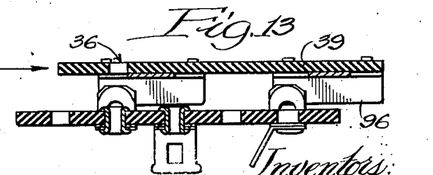
Fig. 13 is a similar view, showing the switch member in actuated relation.
Figure 14:
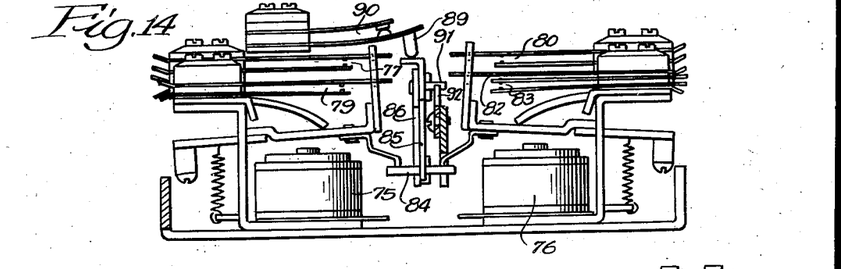
Fig. 14 is a plan view, taken on the line 14—14 of Fig. 6, showing the twenty-five and ten cent relays and associated switches.
Figure 15:
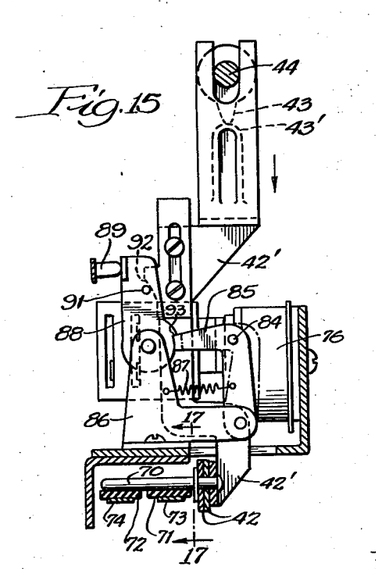
Fig. 15 is a section on line 15—15 of Fig. 6 showing the cam mechanism for actuating the locking bars, together with the associated parts.
Figure 16:
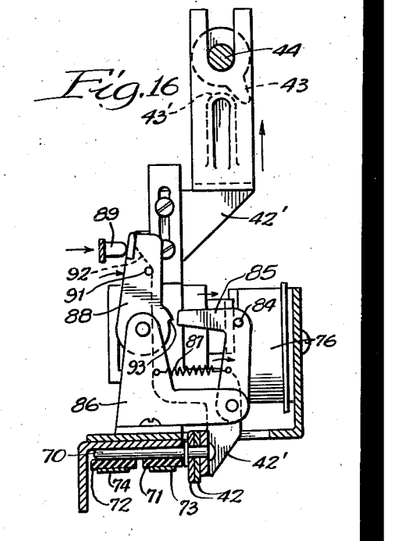
Fig. 16 is a similar view, showing the parts in modified positions resulting from the energization of the twenty-five or ten cent relay and the consequent operation of the motor.
Figure 17:
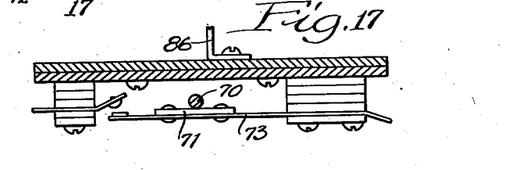
Fig. 17 is a fragmentary sectional detail taken on the line 17—17 of Fig. 15.
Figure 19:
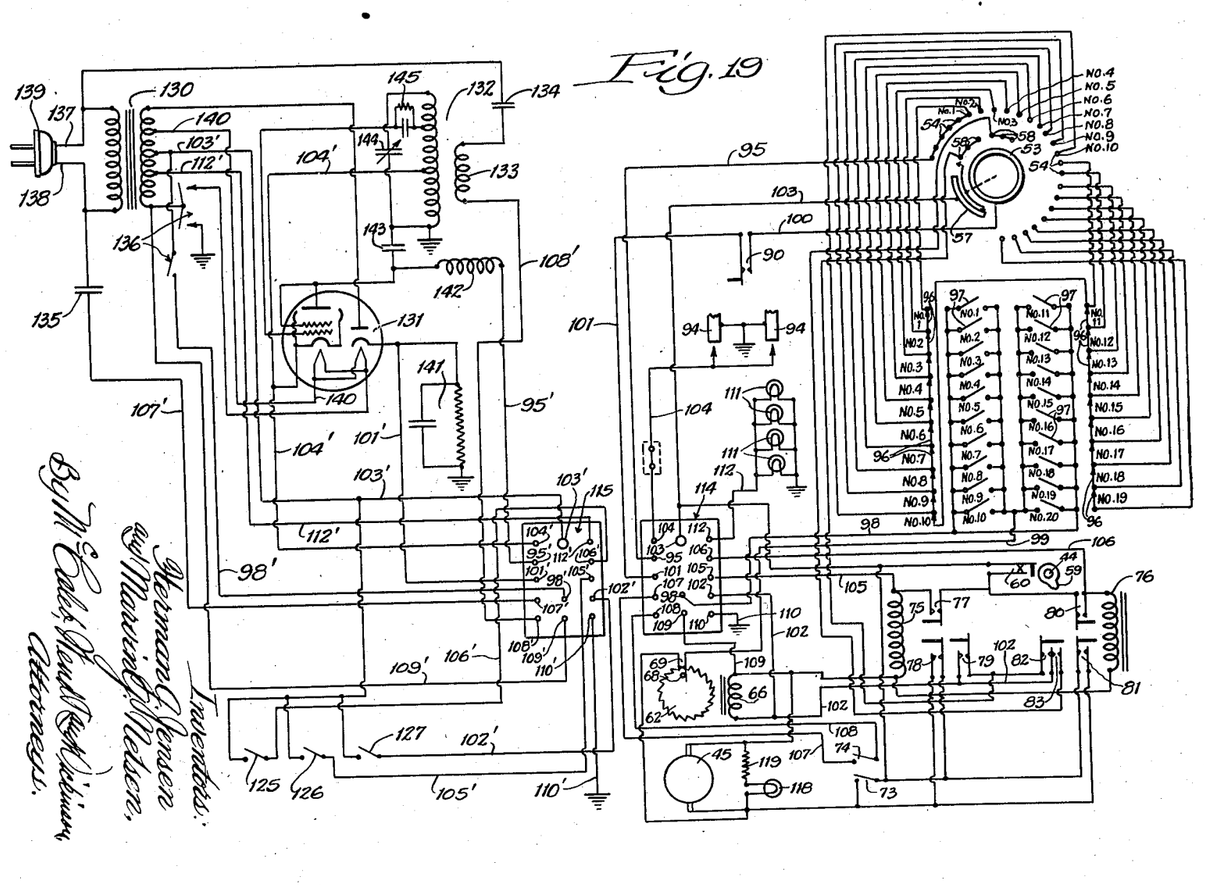
Fig. 19 is a wiring diagram.

The conductors 104, 103, 112, 95, 106, 101, 105, 107, 98, 102, 108, 109, and 110 are formed into a cable and are connected to the corresponding prongs of a plug 114 which is adapted to be plugged into a socket block 115 located in the main body portion 20 which also includes the electrical elements shown on the left-hand side of the wiring diagram (Fig. 19).

The socket block 115 comprises corresponding sockets which bear the same numbers as the aforesaid conductors with the addition of primes, and these sockets are connected to conductors which are also indicated by the same numbers with the addition of primes. That is, the conductor 103, for example, is connected to a prong designated 103, and this prong engages a socket 103' which is connected to a conductor indicated 103', and so forth.

At the top of the vertical housing portion 20 is a coin receptacle 116 which is adapted to receive coins of a plurality of denominations, for example nickels, dimes and quarters. Behind this receptacle, and separated therefrom by a red window 117, is an incandescent lamp 118 which, together with a series resistance 119, is shunted across the terminals of the motor 45. Consequently this lamp gives out a red light when the motor is in operation and serves as a signal to the patron that the machine should not be distributed until the motor stops.

The terminals of the lamp 118 are connected by leads to a suitable terminal block on the chassis 34. The coin receptacle 116 communicates with a coin chute 120 which leads the inserted coin to the inlet opening of a slug-rejecting and coin-separating unit 121. Rejected coins are directed to an exterior pocket 122. Accepted coins drop from the coin-separating unit 121 through their respective channels into a coin box 123.

At the outlet of each coin channel is a pivoted lever 124 which cooperates with a corresponding switch 125, 126, 127. If a quarter is accepted, switch 125 is closed momentarily, if a dime is accepted, switch 126 is closed momentarily, and if a nickel is accepted, switch 127 is closed momentarily.

A button 128 located behind the coin receptacle 116 and lamp 118 is connected to scavenging equipment 129 on the slug rejector.

The vertical housing portion 20 encloses a power transformer 130, a tube 131, which may suitably be a 70L7GT tube, being a rectifier and power amplifier in one unit, an oscillating coil 132, a signal pickup coil 133, condensers 134 and 135, associated elements and a main switch 136, which may be actuated from the exterior of the housing with the aid of a suitable key.

Power is supplied to the device by means of power lines 137 and 138 which are connected to a suitable plug 139 for insertion in any convenient outlet. The primary of the transformer 130 is connected to the conductors 137 and 138. The conductor 138 is connected to one side of the condenser 135, the other side being connected to the conductor 107'.

The conductor 137 is also connected to one side of the condenser 134. The other side of this condenser is connected to one end of the pickup coil 133. The other side of the pickup coil 133 is connected to conductor 108'.

One end of the secondary of the transformer 130 is grounded by the main switch 136 when it is closed. The grounded end of the transformer is connected to conductor 109'. The main switch also, when closed, grounds one side of the filaments of the tube 131. A 5.5-volt tap on the secondary of the transformer 130 is connected to conductor 112' for the supply of current to the lamps 111. A 25-volt tap on the secondary of the transformer 130 is connected to conductor 103'. The main switch 136, when closed, connects conductor 103' to conductor 98'.

The conductor 103' is connected to one side of each of the switches 125, 126 and 127. The other side of switch 125 is connected to conductor 106'. The other side of switch 126 is connected to conductor 105'. The other side of switch 127 is connected to conductor 102'. A 65-volt tap on the secondary of the transformer 130 is connected by conductor 140 to the ungrounded sides of the filaments of the tube 131.

The 120-volt terminal of the secondary of the transformer 130 is connected to the plate of the diode elements of the tube 131. The cathode of these diode elements is connected to conductor 101 and is also connected through a high resistance filter circuit 141 to ground. The filter circuit 141 may include a 39,000-ohm resistor and a 12-microfarad condenser in parallel therewith.

The conductor 95' is connected through a choke coil 142 to a condenser 143 to the plate of the pentode section of the tube 131 and to the screen grid of this section. Conductor 104' is connected to the cathode of the pentode section of the tube 131 and to an intermediate tap on the oscillator coil 132.

The other side of the condenser 143 is connected to the grounded end of the oscillator coil 132 and to one side of a tuning condenser 144 arranged in circuit with the oscillator coil 132 to provide a tank circuit tuned to a definite radio frequency, for example a radio frequency of 200 kilocycles.

A tap on the oscillator coil more remote from the grounded end thereof than the connection of the conductor 104' is connected through a grid leak 145 to the control grid of the pentode section of the tube 131.

It will be understood that the diode section of the tube 131 provides direct current plate voltage for the operation of the pentode section of this tube and that the pentode section of this tube, together with the tank circuit including the oscillating coil 132 and the condenser 144, functions as an oscillator adapted, when operating, to supply energy of definite frequency, for example 200 kilocycles, to the winding 133 from whence this radio frequency energy is supplied to the lines 137 and 138 and thence to the power lines. It will of course be understood that instead of supplying this energy to the power lines, the same may be supplied to any kind of broadcasting antenna.

The operation is as follows: The switch 136 is closed, thus grounding the secondary of the transformer 130, grounding one side of the filaments of the tube 131 and connecting conductor 103' to conductor 98'. It is to be noted that if the switch 136 is open, the patron does not lose his credit since energy is supplied to the circuits which include switches 125, 126 and 127, and the relays 76, 75 and 66, respectively, even when the switch 136 is open. However, the patron is unable to select because the circuit through the switches 97 is disconnected by the switch 136. When, however, the switch 136 is closed, the customer's credit is then on the ratchet wheel 62 and he may make selections in number corresponding to the credit.

In normal operation, however, the switch 136 will be closed, tube 131 will be warmed up. The oscillator circuit which includes the tube 131 and the oscillator coil 132 is not, however, in oscillation, because the plate circuit of the diode elements of the tube 131 is open, the arm 52 being out of engagement with any of the contacts 54. Consequently, direct current plate voltage is not supplied to the plate of the pentode elements of the tube 131.

If a nickel is now inserted in the coin receptacle 116, then a circuit is momentarily established which includes conductor 103', switch 127, conductor 102', conductor 102, electromagnet or relay 66, conductor 109, and conductor 109' back to the secondary of the transformer 130. Consequently, the ratchet wheel 62 moves one tooth and the switch 69 closes, leaving the apparatus in condition for the selection of one selection.

Suppose now that the patron desires the rendition of selection No. 7, he actuates push button 26, No. 7, which closes the corresponding switch 97 opens the corresponding switch 96. The closing of the switch 97 completes the motor circuit as follows: Conductor 109', conductor 109, motor 45, switch 69, conductor 99, closed switch 97 No. 7, conductor 98, conductor 98' and conductor 103', back to the secondary of the transformer.

Consequently the motor starts to operate on the actuation of button 26 No. 7. As has heretofore been described, the opening of the switch 96 No. 7 leaves the first twelve contacts 54 connected together and separated from the remaining thirteen contacts 54.

As the motor drives the shaft 49 through one revolution, the arms 51 and 52, the latter moving over all the contacts 54 during this single revolution, connect the conductor 100 to the conductor 95 twelve times during that revolution. Such connection completes the following circuit: cathode of the diode elements of the tube 131, conductor 101', conductor 101, switch 90, conductor 100, ring 53, arm 51, arm 52, connected contacts 54, conductor 95, conductor 95', choke coil 142, to the plate of the pentode elements of the tube 131. Consequently, these pentode elements, received during this single revolution of the shaft 49, twelve impulses of plate current and these twelve impulses create twelve small regular periods of oscillation in the coil 132 which are communicated to the pickup coil 133 from which it is communicated to the lines 137 and 138 through condensers 134 and 135.

It is to be noted that the coil 133 and the condensers 134 and 135 are in series circuit with the normally open switch 74. This switch, however, is closed immediately the motor starts to operate. The purpose of this switch is to prevent overloading of the line in case a large number of selecting devices are associated therewith. After the one revolution of the shaft 49 is completed, the switch 74 is again opened.

As has been previously noted, the switch 69 is again opened during the revolution of the shaft 49. The motor continues to operate until the shaft 49 has made a complete revolution, the motor circuit being completed as follows: conductor 109', conductor 109, motor 45, switch 73 (which switch closes immediately the motor starts), conductor 103 and conductor 103'. It is to be noted that this carry-over circuit is independent of the switch 136 so that free plays cannot be obtained by merely actuating this switch.

The motor will continue to operate until the shaft 49 has made a complete revolution notwithstanding the fact that the switch 136 may have been opened at an intermediate point in that complete revolution. As has been previously described, the switch 73, like the switch 74, becomes open immediately the revolution of the shaft 49 is completed. The net result of this actuation is that a definite number of impulses, the number depending upon the selector button actuated, of definite radio frequency, are fed into the lines 137 and 138.

The operation resulting from the insertion of a dime will now be described. A dime momentarily closes switch 126 and completes the following circuit: Conductor 103', switch 126, conductor 105', conductor 105, relay 75, conductor 109 and conductor 109', back to the secondary of the transformer 130. The momentary energization of the relay 75 closes the switches 77, 78 and 79. The closing of the switch 77 completes a hold-over circuit which maintains the relay energized, this circuit being: conductor 109', conductor 109, relay 75, switch 77, switch 60, conductor 103, and conductor 103', back to the secondary of the transformer 130.

The motor circuit is now completed through conductor 109', conductor 109, motor 45, closed switch 78, conductor 103, and conductor 103', back to the secondary of the transformer 130. The motor now starts to operate and immediately the switch 73 is closed, completing the carry-over circuit previously referred to, which ensures the operation of the motor until the shaft 49 has made a complete revolution, notwithstanding the fact that the switch 78 is opened during the cycle. The switch 60 is arranged to open momentarily after one-third of the cycle and its opening results in the deenergization of the relay 75 and the opening of switches 77, 78 and 79.

As has been previously described, the energization of the relay 75 effects the withdrawal of the detent 85 from the arm 88 so that this arm is free to move rearwardly when the bar assembly 42' moves upwardly, thus permitting the switch 90 to open. This switch remains open during the complete revolution of the shaft 49, notwithstanding the deenergization during that revolution of the relay 75. This, as has previously been explained, results from the fact that the arm 88 is not returned to a position to close the switch 90 until the end of the complete revolution, whereupon the bar assembly 42' moves downwardly and its cam member 43 engages the pin 84 of the arm 88, moving it forwardly again to close the switch 90 and to bring the shoulder 93 above the detent 85.

Consequently, during the complete revolution of the shaft 49, as a result of the energization of the relay 75, the plate circuit of the pentode elements of the tube 131 is open and no impulses are sent out over the power lines. During the initial part of this complete revolution of the shaft 49, the arms 55 and 56 make electrical connection three times between the sector 57 and the first three contacts 58. Consequently, the electromagnet 66 is energized three times during the initial part of the revolution of the shaft 49, the circuit being as follows: conductor 109', conductor 109, electromagnet or relay 66, switch 79, first three contacts 58, arm 56, arm 55, sector 57, conductor 103 and conductor 103' back to the secondary of the transformer 130. It is to be noted that the last three contacts 58 are inoperative during this operation, the switch 83 being open. As a result of the completion of this circuit three times, the ratchet wheel 62 has been moved three teeth away from its initial position, thus closing the switch 69.

During a subsequent part of the complete revolution of the shaft 49, the detent 61 returns the ratchet wheel 62 one step so that at the end of the complete revolution, the ratchet wheel 62 is removed by two teeth from its normal or inoperative position, thus providing the patron with two selections for his dime. Of course the device can be arranged to give a larger number of selections for this or any other particular coin. Thus, instead of connecting three contacts 58 together, a greater number of contacts may be provided. Thus, for three plays for a dime, the first series of contacts 58 should include four contacts, and so forth.

The device is now conditioned for two selections which may be made in the same manner as described above in connection with button No. 7. The net result of the operation of said button No. 7 is the transmission of twelve radio frequency impulses into the power lines and the movement of the ratchet wheel 62 back one step. The second selection which the patron may make by pressing button No. 12, for example, is that seventeen impulses are sent over the line and the ratchet wheel 62 is moved one step towards its initial position. During the last operation of the motor to which the patron is entitled, the pin 68 opens the switch 69 and further selections are impossible until further coins are inserted in the device.

The insertion of a quarter, or twenty-five-cent piece, has the result of closing momentarily the switch 125 which results in the energization of the relay 76 and the closing of the switches 80, 81, 82 and 83. Switch 80 is a carry-over switch which operates in the same manner as the switch 77. Switch 81 puts the motor in operation in the same manner as described above in connection with switch 78. The switches 82 and 83 have the same function as the switch 79 but they connect both series of contacts 58 to the electromagnet 66.

Consequently, during the revolution of the shaft 49, resulting from the insertion of a quarter, the electromagnet 66 is energized six times and the ratchet wheel 62 is moved six teeth away from its initial position. During this complete revolution, the detent 61 moves the ratchet wheel 62 one tooth back towards initial position, leaving the ratchet wheel displaced five steps from its initial position as a result of the insertion of a twenty-five-cent piece. Of course it will be understood that in this case also, any desired number of plays may be given for a quarter. Thus, if it is desired to give seven plays for a quarter there ought to be eight contacts 58 instead of six, as is shown in the drawings.

At the end of this first complete revolution, the switch 90 closes, as has previously been described, and the device is conditioned for five selections to be made by the patron. After he has made these five selections, the motor switch 69 is opened by the ratchet wheel 62 and the device must be energized by the insertion of a coin or coins before any further selections may be made.

No disclosure has been made herein of the phonograph adapted to be controlled by the remote control unit or of the mechanism thereat which receives the impulses sent out by this remote control unit. It is to be understood that such phonograph and such mechanism may be that described and claimed in the aforesaid applications Serial No. 259,586, filed March 3, 1939, by James A. Boyajian, and Serial No. 341,433, filed June 20, 1940, by James A. Boyajian, and application Serial No. 342,419, filed June 26, 1940, by Marion R. Winkler.

It will readily be understood with reference to these applications that the twelve radio frequency impulses supplied to the conductors 137 and 138 as a result of the actuation of button 26, have the effect of starting the phonograph and the rendition of the playing of recording No. 7 on the phonograph. Likewise it will readily be understood from the aforesaid copending applications that any other series of impulses, for example twenty impulses, resulting from the actuation of button 26 No. 15, has the effect of starting the phonograph and effecting the rendition of recording No. 15. Further it will be understood that any number of the buttons 26 may be actuated one after the other, and that the phonograph starts playing the recording corresponding to the first series of impulses and that the effect of successive series of impulses is to condition the phonograph for the continuous playing of all the corresponding recordings one after the other until all the recordings paid for and selected have been reproduced by the phonograph.

Although the invention has been described in connection with specific details of a preferred embodiment thereof, it must be understood that such details are not intended to be limitative of the invention except in so far as set forth in the accompanying claims.

Having thus described our invention, we declare that what we claim is:

1. A control unit for automatic phonographs adapted to transmit trains of impulses of various numbers to control selection of corresponding individual recordings, comprising a plurality of signal contacts, means arranged to move over said contacts, a control circuit including said movable means and a selected number of said contacts arranged to transmit a series of impulses corresponding to the selected number of said contacts, individual selector means each arranged to include a different selected number of said contacts in said circuit, a plurality of credit contacts, means associated with first said movable means and arranged to move over said credit contacts, credit storing means, a second circuit operatively connected to said credit contacts and the second movable means to cause said credit storing means to operate to an extent depending upon the number of said contacts, coin actuated means for rendering second said circuit operative, and means associated with said credit storing means controlling the effectiveness of said selector means to transmit said impulses.

2. A control unit for automatic phonographs adapted to transmit trains of impulses of various numbers to control selection of corresponding individual recordings, comprising an impulser including a motor arranged to transmit a selected number of signal impulses, a second impulser arranged to be operated by said motor, credit storing means operatively associated with said second impulser whereby said credit storing means is actuated a plurality of times by each operation of the second impulser, means associated with said credit storing means controlling the effectiveness of the first impulser to transmit signal impulses, and coin actuated means for rendering the second impulser operative and for rendering the first impulser inoperative when the second impulser is operating.

3. A control unit for automatic phonographs adapted to transmit trains of impulses of various numbers to control selection of corresponding individual recordings, comprising an impulser including a motor and arranged to transmit a selected number of signal impulses, a second impulser arranged to be operated by said motor, credit storing means operatively associated with said second impulser whereby the operation of the second impulser causes said credit storing means to operate a plurality of times depending upon the number of impulses created by the second impulser, selector means to control the number of impulses transmitted by the first impulser and to initiate the operation of the motor, means normally rendering the second impulser inoperative, coin actuated means for rendering the first impulser inoperative and rendering the second impulser and motor operative, and means associated with said credit storing means for controlling the effectiveness of the selector means to transmit signal impulses.

4. A control unit for automatic phonographs adapted to transmit trains of impulses of various numbers to control selection of corresponding individual recordings, comprising an impulser including a motor and arranged to transmit a selected number of signal impulses, a second impulser arranged to be operated by said motor, credit storing means operatively associated with the second impulser whereby the credit storing means is actuated a plurality of times by the operation of the second impulser, selector means for controlling the number of impulses transmitted by the first impulser, means controlled by the credit storing means cooperating with said selector means to initiate the operation of the motor, means normally rendering the second impulser inoperative, and coin actuated means for rendering the first impulser inoperative and rendering the second impulser and said motor operative.

5. A control unit for automatic phonographs adapted to transmit trains of impulses of various numbers to control selection of corresponding individual recordings, comprising an impulser including a motor arranged to transmit a selected number of signal impulses, a second impulser arranged to be operated by said motor, credit storing ratchet means operatively associated with said second impulser whereby said ratchet means is actuated a plurality of times by the operation of the second impulser, a switch controlled by said credit storing means, selector means including switches arranged to control the number of impulses transmitted by the first impulser and switches cooperating with the first mentioned switch to initiate the operation of the motor, means normally rendering the second impulser inoperative, and coin actuated means for rendering the first impulser inoperative and rendering the second impulser and the motor operative.

6. A control unit for automatic phonographs adapted to transmit trains of impulses of various numbers to control selection of corresponding individual recordings, comprising an impulser including a motor and arranged to transmit a selected number of signal impulses, a second impulser arranged to be operated by said motor, credit storing ratchet means operatively associated with the second impulser whereby the ratchet means is actuated a plurality of times by the operation of the second impulser, a switch controlled by the credit storing means, selector means including switches arranged to control the number of impulses transmitted by the first impulser, and switches cooperating with the first mentioned switch to initiate the operation of the motor, means normally rendering the second impulser inoperative, coin actuated means for rendering the first impulser inoperative and rendering the second impulser and said motor operative, and means actuated by the motor for moving said credit storing ratchet means step by step in credit discharging direction.

7. A control unit for automatic phonographs adapted to transmit trains of impulses of various numbers to control selection of corresponding individual recordings, comprising a plurality of signal contacts, a shaft, means carried by said shaft to move over said contacts, a motor arranged to drive said shaft through a single revolution, a control circuit including said signal contacts and said movable means, individual selector means each arranged to eliminate a predetermined number of said contacts from said circuit whereby the number of impulses transmitted may be selectively controlled, a plurality of credit contacts, means carried by said shaft and arranged to move over said credit contacts, credit storing means operatively connected to said contacts and last said moving means whereby the credit storing means may be actuated a plurality of times depending upon the number of said contacts, coin actuated means completing the circuit of the credit contacts and the second moving means and said credit storing means, and means associated with the credit storing means for controlling the effectiveness of said selector means to control the transmission of trains of impulses.

8. A control unit for automatic phonographs adapted to transmit trains of impulses of various numbers to control selection of corresponding individual recordings, comprising a plurality of signal contacts, a shaft, means carried by said shaft to move over said contacts, a motor arranged to drive said shaft through a single revolution, a control circuit including said signal contacts and said movable means, individual selector means each arranged to eliminate a predetermined number of said contacts from said circuit whereby the number of impulses transmitted may be selectively controlled, a plurality of credit contacts, means carried by said shaft and arranged to move over said credit contacts, credit storing means operatively connected to said credit contacts and the second moving means whereby the storing means is actuated a plurality of times depending upon the number of credit contacts, coin actuated means completing the circuit of the credit contacts the second moving means and the credit storing means and for rendering the first circuit inoperative, and means associated with the credit storing means to control the effectiveness of said selector means to control the transmission of signal impulses.

9. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving a coin, a switch adapted to be operated by said coin, credit ratchet means controlling said coin controlled switch, means operable by said motor for returning said ratchet means a step towards switch opening position during each revolution of said shaft, electromagnetic means for moving said ratchet means step by step in the opposite direction, a relay adapted to be energized by said coin operated switch, a plurality of credit contacts, an arm on said shaft means adapted to engage said credit contacts, a switch on said delay adapted to connect said credit contacts and last said arm in circuit with said electromagnetic means, and a normally open switch on said relay adapted to initiate the operation of said motor.

10. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving a coin, a switch adapted to be operated by said coin, credit ratchet means controlling said coin controlled switch, means operable by said motor for returning said ratchet means a step towards switch opening position during each revolution of said shaft, electromagnetic means for moving said ratchet means step by step in the opposite direction, a relay adapted to be energized by said coin operated switch, a plurality of credit contacts, an arm on said shaft means adapted to engage said credit contacts, a switch on said relay adapted to connect said credit contacts and last said arm in circuit with said electromagnetic means, a switch on said relay for maintaining said relay energized, a normally closed switch in series with last said switch, means controlled by the motor for momentarily opening said normally closed switch during the revolution of said shaft means, and a normally open switch on said relay adapted to initiate the operation of said motor.

11. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carryover switch controlled by said motor and adapted to open the circuit thereof when a single revolution of said shaft means is completed, a normally open coin controlled switch in circuit with last said switch means, means for receiving a coin, a switch adapted to be operated by said coin, credit ratchet means controlling said coin controlled switch, means operable by said motor for returning said ratchet means a step towards switch opening position during each revolution of said shaft, electromagnetic means for moving said ratchet means step by step in the opposite direction, a relay adapted to be energized by said coin operated switch, a plurality of credit contacts, an arm on said shaft means adapted to engage said credit contacts, a switch on said relay adapted to connect said credit contacts and last said arm in circuit with said electromagnetic means, and a normally open switch on said relay adapted to initiate the operation of said motor, a normally closed switch in first said impulser circuit, latch means normally maintaining said switch closed, means on said relay for moving said latch means to unlatching position and means actuated by the motor near the end of the complete revolution of said shaft means for closing said switch and permitting relatching thereof.

12. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving a coin, a switch adapted to be operated by said coin, credit ratchet means controlling said coin controlled switch, means operable by said motor for returning said ratchet means a step towards switch opening position during each revolution of said shaft, electromagnetic means for moving said ratchet means step by step in the opposite direction, a relay adapted to be energized by said coin operated switch, a plurality of credit contacts, an arm on said shaft means adapted to engage said credit contacts, a switch on said relay adapted to connect said credit contacts and last said arm in circuit with said electromagnetic means, a switch on said relay for maintaining said relay energized, a normally closed switch in series with last said switch, means controlled by the motor for momentarily opening said normally closed switch during the revolution of said shaft means, and a normally open switch on said relay adapted to initiate the operation of said motor, a normally closed switch in first said impulser circuit, latch means normally maintaining said switch closed, means on said relay for moving said latch means to unlatching position and means actuated by the motor near the end of the complete revolution of said shaft means for closing said switch and permitting relatching thereof.

13. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving coins of two different denominations, a pair of switches adapted to be operated individually by coins of different denominations, credit ratchet means controlling said coin controlled switch, means operable by said motor for returning said ratchet means a step towards switch opening position during each revolution of said shaft, electromagnetic means for moving said ratchet means step by step in the opposite direction, a pair of relays each adapted to be energized by one of said coin operated switches, a plurality of credit contacts, an arm on said shaft means adapted to engage said credit contacts, a switch on each of said relays adapted to connect a different number of said credit contacts and last said arm in circuit with said electromagnetic means, and a normally open switch associated with each relay adapted to initiate the operation of said motor.

14. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving coins of two different denominations, a pair of switches adapted to be operated individually by coins of different denominations, credit ratchet means controlling said coin controlled switch, means operable by said motor for returning said ratchet means a step towards switch opening position during each revolution of said shaft, electromagnetic means for moving said ratchet means step by step in the opposite direction, a pair of relays each adapted to be energized by one of said coin operated switches, a plurality of credit contacts, an arm on said shaft means adapted to engage said credit contacts, a switch on each of said relays adapted to connect a different number of said credit contacts and last said arm in circuit with said electromagnetic means, a switch on each relay for maintaining said relay energized, a normally closed switch in series with last said switch, means controlled by the motor for momentarily opening last said switch during the revolution of said shaft means, and a normally open switch associated with each relay adapted to initiate the operation of said motor.

15. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carryover switch controlled by said motor and adapted to open the circuit thereof when a single revolution of said shaft means is completed, a normally open coin controlled switch in circuit with last said switch means, means for receiving coins of two different denominations, a pair of switches adapted to be operated individually by coins of different denominations, credit ratchet means controlling said coin controlled switch, means operable by said motor for returning said ratchet means a step towards switch opening position during each revolution of said shaft, electromagnetic means for moving said ratchet means step by step in the opposite direction, a pair of relays each adapted to be energized by one of said coin operated switches, a plurality of credit contacts, an arm on said shaft means adapted to engage said credit contacts, a switch on each of said relays adapted to connect a different number of said credit contacts and last said arm in circuit with said electromagnetic means, and a normally open switch associated with each relay adapted to initiate the operation of said motor, a normally closed switch in first said impulser circuit, latch means normally maintaining said switch closed, means on said relay for moving said latch means to unlatching position and means actuated by the motor near the end of the complete revolution of said shaft means for closing said switch and permitting relatching thereof.

16. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving coins of two different denominations, a pair of switches adapted to be operated individually by coins of different denominations, credit ratchet means controlling said coin controlled switch, means operable by said motor for returning said ratchet means a step towards switch opening position during each revolution of said shaft, electromagnetic means for moving said ratchet means step by step in the opposite direction, a pair of relays each adapted to be energized by one of said coin operated switches, a plurality of credit contacts, an arm on said shaft means adapted to engage said credit contacts, a switch on each of said relays adapted to connect a different number of said credit contacts and last said arm in circuit with said electromagnetic means, a switch on each relay for maintaining said relay energized, a normally closed switch in series with last said switch, means controlled by the motor for momentarily opening last said switch during the revolution of said shaft means, and a normally open switch associated with each relay adapted to initiate the operation of said motor, a normally closed switch in first said impulser circuit, latch means normally maintaining said switch closed, means on said relay for moving said latch means to unlatching position, and means actuated by the motor near the end of the complete revolution of said shaft means for closing said switch and permitting relatching thereof.

17. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving coins of two different denominations, a pair of switches adapted to be operated individually by coins of different denominations, credit ratchet means controlling said coin controlled switch, means operable by said motor for returning said ratchet means a step towards switch opening position during each revolution of said shaft means, electromagnetic means for moving said ratchet means step by step in the opposite direction, means connecting one of said coin operated switches to said electromagnetic means, a relay adapted to be energized by the other coin operated switch, a plurality of credit contacts, an arm on said shaft means adapted to engage said credit contacts, a switch on said relay to connect a predetermined number of credit contacts and last said arm in circuit with said electromagnetic means, and a normally open switch associated with the relay adapted to initiate the operation of said motor.

18. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving coins of a plurality of different denominations, a plurality of switches adapted to be operated individually by coins of different denominations, credit ratchet means controlling said coin controlled switch, means operable by said motor for returning said ratchet means a step towards switch opening position during each revolution of said shaft means, electromagnetic means for moving said ratchet means step by step in the opposite direction, means connecting one of said coin operated switches directly to said electromagnetic means, a plurality of relays each adapted to be energized by another of said coin operated switches, a plurality of credit contacts, an arm on said shaft means adapted to engage said credit contacts, a switch on each of said relays adapted to connect a different number of said credit contacts and last said arm in circuit with said electromagnetic means, and a normally open switch associated with each relay adapted to initiate the operation of said motor.

19. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving coins of two different denominations, a pair of switches adapted to be operated individually by coins of different denominations, credit ratchet means controlling said coin controlled switch, means operable by said motor for returning said ratchet means a step towards switch opening position during each revolution of said shaft means, electromagnetic means for moving said ratchet means step by step in the opposite direction, means operatively connecting one of said coin operated switches to said electromagnetic means, a relay adapted to be energized by the other of said coin operated switches, a plurality of credit contacts, an arm on said shaft means adapted to engage said credit contacts, a switch on said relay adapted to connect said credit contacts and last said arm in circuit with said electromagnetic means, a switch on said relay for maintaining said relay energized, a normally closed switch in series with last said switch, means controlled by the motor for momentarily opening last said switch during the revolution of said shaft means, and a normally open switch associated with said relay adapted to initiate the operation of said motor, a normally closed switch in first said impulser circuit, latch means normally maintaining said switch closed, means in said relay for moving said latch means to unlatching position, and means actuated by the motor near the end of the complete revolution of said shaft means for closing said switch and permitting relatching thereof.

20. A control unit for automatic phonographs comprising a plurality of signal contacts, shaft means, a wiper arm carried by said shaft means adapted to engage said contacts, a motor adapted to drive said shaft means through a complete revolution, an impulser circuit including said contacts and wiper arm, a plurality of selector means adapted to be manually operable to disconnect a selected number of contacts from said circuit, switch means associated with said selector means adapted to initiate the operation of said motor, a carry-over switch controlled by said motor and adapted to open the circuit thereof when a single revolution of said shaft means is completed, a normally open coin controlled switch in circuit with last said switch means, means for receiving coins of a plurality of different denominations, a plurality of switches adapted to be operated individually by coins of different denominations, credit ratchet means controlling said coin controlled switch, means operable by said motor for returning said ratchet means a step towards switch opening position during each revolution of said shaft means, electromagnetic means for moving said ratchet means step by step in the opposite direction, means connecting one of said coin operated switches to said electromagnetic means, a plurality of relays each adapted to be energized by one of the other of said coin operated switches, a plurality of credit contacts, an arm on said shaft means adapted to engage said credit contacts, a switch on each of said relays adapted to connect a different number of said credit contacts and last said arm in circuit with said electromagnetic means, a switch on each relay for maintaining said relay energized, a normally closed switch in series with last said switch, means controlled by the motor for momentarily opening last said switch during the revolution of said shaft means, and a normally open switch associated with each relay adapted to initiate the operation of said motor, a normally closed switch in first said impulser circuit, latch means normally maintaining said switch closed, means on said relay for moving said latch means to unlatching position, and means actuated by the motor near the end of the complete revolution of said shaft means for closing said switch and permitting relatching thereof.

21. In a control unit for automatic phonographs, in combination, a magazine switch comprising ratchet means, electromagnetic means for moving said ratchet means step by step from switch opening position, and means for moving said ratchet means step by step toward switch opening position, an impulser comprising motor means arranged to transmit a definite number of electrical impulses to said electromagnetic means, a coin actuated switch for initiating the operation of said motor means, and automatic means for arresting said motor means after transmission of said impulses.

22. In a control unit for automatic phonographs, in combination, a magazine switch comprising ratchet means, electromagnetic means for moving said ratchet means step by step from switch opening position, and means for moving said ratchet means step by step toward switch opening position, an impulser comprising motor means arranged to transmit a selected number of electrical impulses to said electromagnetic means, a plurality of coin controlled means for initiating the operation of said motor means and determining the number of impulses to be transmitted, and automatic means for arresting said motor means after the transmission of said impulses.

23. In a control unit for automatic phonographs, in combination, a magazine switch comprising ratchet means, electromagnetic means for moving said ratchet means step by step from switch opening position, an impulser comprising motor means arranged to transmit a definite number of electrical impulses to said electromagnetic means, a coin actuated switch adapted to energize said electromagnetic means, a second coin actuated switch for initiating the operation of said motor means, means actuated by said motor means for moving said ratchet means step by step towards switch opening position, and automatic means for arresting said motor means after the transmission of said impulses.

24. In a control unit for automatic phonographs, in combination, a magazine switch comprising ratchet means, electromagnetic means for moving said ratchet means step by step from switch opening position, an impulser comprising motor means arranged to transmit a selected number of electrical impulses to said electromagnetic means, a plurality of coin actuated switches, a plurality of relays associated individually with last said switches, means on said relays for initiating the operation of said motor means and determining the number of impulses to be transmitted, means for moving said ratchet means step by step towards switch opening position, and automatic means for arresting said motor means after the transmission of said impulses.

25. In a control unit for automatic phonographs, in combination, a magazine switch comprising ratchet means, electromagnetic means for moving said ratchet means step by step from switch opening position, an impulser comprising motor means arranged to transmit a selected number of electrical impulses to said electromagnetic means, a plurality of coin actuated switches, means connecting one of last said coin actuated switches to said electromagnetic means associated with the other coin actuated switches, a plurality of relays associated individually with last said switches, means on said relays for initiating the operation of said motor means and determining the number of impulses to be transmitted, means for moving said ratchet means step by step towards switch opening position, and automatic means for arresting said motor means.

HERMAN G. JENSEN.
MARVIN G. NELSEN.